UNITED STATES PATENT OFFICE.

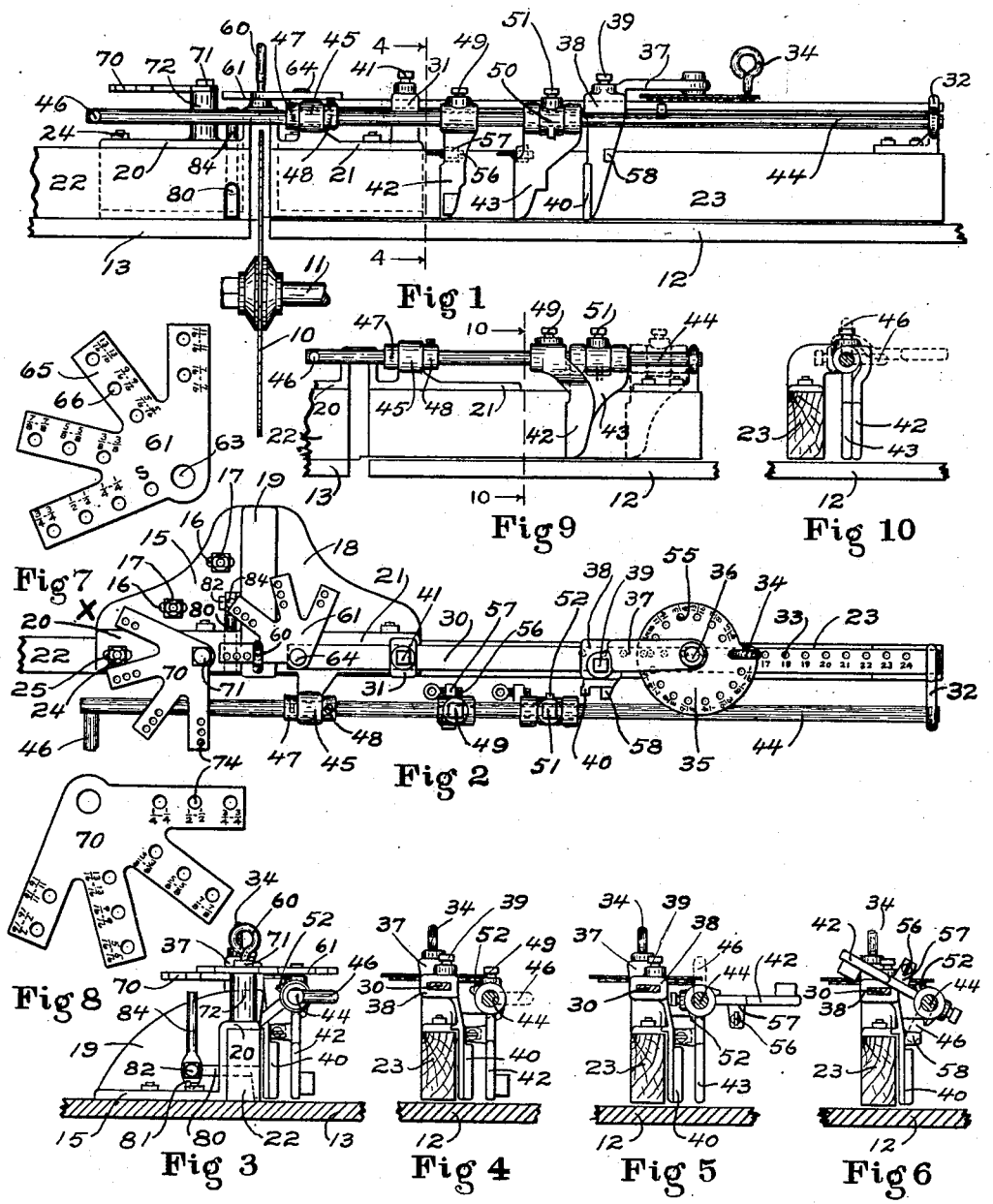

THOMAS BEMIS, OF INDIANAPOLIS, INDIANA.

SAW-GAGE.

1,194,936. Specification of Letters Patent. Patented Aug. 15, 1916.

Application filed May 31, 1912. Serial No. 700,712.

*To all whom it may concern:*

Be it known that I, THOMAS BEMIS, a citizen of the United States, and a resident of Indianapolis, county of Marion, and State of Indiana, have invented a certain useful Saw-Gage; and I do hereby declare that the following is a full, clear, and exact description thereof, reference being had to the accompanying drawings.

The object of this invention is to provide improvements in saw gages to accomplish various objects.

One object of the invention is to provide a gage with a series of stops arranged so that the preceding stops can be controlled by the operator at will, without moving the board in any other direction than toward the stop desired.

Another object is to arrange the device so that it is readily adjustable to cut a plurality of different lengths without removing or replacing the board, that is, without pushing, then pulling the board outward and inward past the preceding stops as is necessary in other gages. In other words, the preceding stop or stops can be moved out of the way without removing or otherwise manipulating the board. Also the device enables the stops to be accurately and positively set without the use of a rule or measure.

Another object is to utilize a main stop for accurately positioning the other stops.

Another object of the invention is to provide a combined saw gage and guard; also to adjust the device on a table so that the said mechanism will register accurately with the saw; also to provide means to prevent the pinching of the saw by a board the edge of which next to the gage is concave.

Another important object of the invention is to arrange it so that it will calculate and may be set, when cutting the sides, tops and bottoms of boxes, to give them the total outside length sufficient to provide for the thickness of the ends of the box, and also to give both the thickness of the ends and the thickness of the cleats when the boards are being cut for use in cleated boxes.

The nature of my invention and the means for accomplishing the above objects will be understood from the accompanying drawings and the following description and claims:

In the drawings, Figure 1 is a rear elevation of the device, a part of the movable table being broken away. Fig. 2 is a plan view thereof. Fig. 3 is an elevation of the right-hand end of the device from the operator's position, with the movable table in section. Fig. 4 is a transverse section on the line 4—4 of Fig. 1. Fig. 5 is the same as Fig. 4, showing one of the stops elevated out of the way. Fig. 6 is the same, showing two of the stops turned up out of the way. Fig. 7 is a plan view of one of the calculators or gage adjusters. Fig. 8 is a plan view of another calculator or gage adjuster. Fig. 9 is a rear view of a portion of the device, showing it in modified form, the main stop and the preceding stop being on the same rod. Fig. 10 is a transverse section on the line 10—10 of Fig. 9.

In the drawings herein there is shown a saw 10 on an arbor or shaft 11 mounted in and driven by means not here shown. There is a stationary table 12 and a slidable table 13, one on each side of the saw. The operator stands with the table 12 at his left hand and the table 13 at his right hand and when the words "right" and "left" are herein used, they are used with reference to the operator's position. The means for mounting the table 13 so that it is movable is not here shown, but the gage hereafter described, is secured or mounted on said slidable table 13 and when the board to be cut is in place, the whole device, including the table 13, is pushed toward the saw, but as stated before, the table 12 is stationary.

The device includes a main casting, frame or gage support having a triangular plate 15 which is provided with two slots 16 through which bolts 17 extend for securing the same to the sliding table 13. There is another triangular plate 18 and between them there is a saw guard 19. Each triangular plate 15 and 18 has at its rear an angle bar 20 and 21, respectively. These parts, the two plates 15 and 18, the saw guard 19 and the angle bars 20 and 21 are all shown and may be integral or otherwise rigid with relation to each other. A wooden guide bar 22 is secured to the metal angle bar 20 and a corresponding wooden guide bar 23 is secured to the metal angle bar 21, the two guide bars being in alinement with each other and the board to be sawed is placed on the table against said guide bars 22 and 23. The guide bar 22 is secured by a bolt 24 which passes through a slot 25 in the angle bar 20. The slots 16 and 25 extend longitudinally of the device and are for the purpose of enabling the device to be adjusted longitudinally so that the gage will indicate accurately with reference to the saw. Also attention is called to the combination of the saw guard with the gage device so as to constitute a part of it and yet safeguard the operator.

There is a gage bar 30 which extends longitudinally of the device and is slidingly mounted, the inner end being mounted in a housing 31, see Fig. 2, which extends up from the angle bar 21 and the outer end in the housing 32 which extends up from the outer end of guide 23. A set screw 41 in the housing 31 is used to clamp the gage bar 30 in any position in which it is set. The gage bar 30 is shown here to be a plain flat bar and the outer half or portion of it is provided with a series of holes 33 which are preferably an inch apart from center to center and adjacent to them there are numerals indicating the distance which the main stop will be from the saw when the pin 34 through the dial 35 is inserted in one of the holes 33.

The dial 35 is a cam-shaped disk rotatably mounted on a pivot 36 in an arm 37 from the slide block 38 which is slidingly mounted on the gage bar 30 and which carries the downwardly extending main stop 40. A set screw 39 in the slide block 38 enables it to be clamped on the bar 30 when it is set. In the form of the device herein illustrated in the first eight figures, there are two other stops 42 and 43 corresponding with the stop 40, but said stops 42 and 43 are carried by a rod 44 which extends longitudinally of the device and is to the rear of the gage bar 30 and at its outer end is mounted in the housing 32 and toward its inner end it is mounted in a bearing 45 carried by the angle bar 21 so as to be oscillatable by a handle 46 at the extreme inner end. This is in a convenient position for the workman who stands at the point marked X. Collars 47 and 48 are located on each side of the bearing 45 to prevent longitudinal movement of the rod 44. The stop 42 is slidable on the rod 44 and is secured in any position thereon by a set screw 49 so that when the rod 44 is oscillated, it will elevate the stop 42 up out of the way of the board, as shown in Fig. 5. The stop 43 is mounted on the rod 44 by two ears between which there is a collar 50 which can be locked on the rod 44 by a set screw 51 and said collar 50 has a lug 52 in position to engage the stop 43 after the rod 44 has been oscillated, say 90 degrees from the normal position, see Fig. 5, and causes the stop 43 to be elevated out of the way of the board by the further oscillation of the rod 44, as shown in Fig. 6, so that the board will reach the main stop 40.

By having the stops 40, 42 and 43 located in various positions it is obvious that the operator can readily adjust them to cut boards of different lengths and do so instantly and without stopping the operation of the machine or changing the movement of the board or his own position, the handle 46 being within his reach and control. The main stop 40 is adjusted or set by the dial 35 and pin 34 being inserted in the proper hole 33 of the gage bar 30, so that it will cut the board any desired length. The numerals on the dial 35 represent fractions of an inch, that is, fractions of the space between any pair of holes 33 and said numerals are located with reference to a series of holes 55 in the dial 35 which are eccentrically arranged, as shown, so that the terminal holes will be fifteen-sixteenths of an inch apart from center to center.

The stop 42 is adjusted by first setting the main stop 40 at the position where it is desired that the stop 42 be located, and then loosening the set screw 49 and sliding the stop 42 on the rod 44 until an adjusting screw 56 in a lug 57 in the stop 42 abuts against a lug 58 on the stop 40. Then the faces of the stop 40 and the stop 42 will be flush. The stop 43 is set in the same way that the stop 42 is set. In this way each stop 42 and 43 is located at the right distance from the saw and then the stop 40 is located at the right distance from the saw.

The gage bar 30 is located in proper position by a pin 60 extending through the hole S in the calculator or adjusting plate 61, and a hole in the top of the saw guard 19. This hole is not shown, but the pin 60 extends through it when in the position shown in Figs. 1 and 2. The plate 61 has a hole 63 in it whereby it is pivoted by a pin 64 to the gage bar 30 so that the plate can be oscillated. The adjusting plate 61 has pivotal radial arms 65, as herein shown, which are provided with holes 66 located at various distances from the center of the hole 63. Adjacent to each hole 66 there are two equal fractions which when added together indicate in fractions of an inch the distance the center of such hole is from the center of the hole 63. Thus the center of the first hole to the left of the hole S in Fig. 7, is one-half of an inch from the center of the hole 63 and, therefore, the fractions are one-fourth and one-fourth. Thus fractions are used which alone indicate only one-half of said length, but they are doubled so as to equal the whole length. The object of this double fraction indication is to indicate the thickness of the two end boards of the box, which thickness must be provided for in determining the lengths of the top boards of the box. Thus when the first hole to the left of the hole S is used, it means that the boards to be sawed are for use in a box having two end boards one-fourth of an inch thick. For ordinary or standard sawing the hole S is used, that is, the pin 60 is inserted through it into a hole in the saw guard 19 and that locates the correct position of the gage bar 30. When the side boards of a box must also provide for the thickness of cleats for the box, another adjusting plate 70 is employed. It is similar in form to the plate 61, but it is pivoted by a pin 71 on the opposite side of the saw guard and upon a post 72 from the angle bar 20. In the form here shown, this plate also has radially extending arms with holes 74 therein, and adjacent to each of said holes there are two equal fractions indicated for representing the thickness of the cleats at the two ends of the box. The holes in the two plates 70 and 61 are in the same sides of the arms whereby when the plate 70 is turned around so that one of its arms will overlap one of the arms of the plate 61 to enable the pin 60 to pass through a hole in each arm in each plate, the indicating numerals on the arms of both plates will still be visible, but the holes in the two sets of plates to be used will register with each other. In arranging the plates thus, however, it is necessary to loosen the gage bar 30 and push it and the plate 61 into such position as to enable the pin 60 to pass through the right hole in the plate 61.

The operation of the device is as follows: The stop 42 is first located and then the stop 43 and then the stop 40 in the manner heretofore shown, by using the dial 35, pin 34 and holes 33 in the gage bar 30, when it is desired to saw boards of various lengths and the outside measurements for such lengths are given. At that time the pin 60 extends through the hole S into a hole in the top of the saw guard 19. To arrange the device to cut the boards of a regular box, not cleated, in which the ends may be of one length and the sides, top and bottom of another length, the stop 42 is adjusted in the manner above explained, for cutting the ends of the box and the stop 40 is adjusted for cutting the tops, sides and bottoms, but set to the inside measurements. Then the pin 60 is withdrawn and the gage bar 30 moved longitudinally until the proper hole 66 in the plate 61 registers with the hole in the saw guard so as to indicate the thickness of the two ends of the box. The pin 60 is then reinserted and with the device in this position, without any calculating on the part of the operator, it will saw the parts of the box the proper length.

To make a cleated box the foregoing adjustment is repeated for the tops and bottoms of the box and since the sides must be made still longer to cover the cleats, the pin 60 is withdrawn, the plate 70 is thrown around so as to overlap the plate 61 and gage bar 30 is shifted longitudinally until the proper holes register with each other so as to saw the proper thickness of the two ends and the cleats, and then the pin 60 is inserted and that will enable the side boards to be cut long enough to cover both the ends and the cleats.

To enable the device to saw satisfactorily a board, the inner edge of which is concave, there is provided a longitudinally movable pin 80 which extends through the plate 20 and wooden guide 22 and its inner end is turned down, as shown in Figs. 1 and 3, in position to engage the inner edge of the board. It is forced against the board by a cam 81 fulcrumed on a pin 82 extending from the side of the saw guard 19 and ᴄo operated by a handle 84. Thus if the handle 84, as shown in Fig. 3, is turned to the left, the cam projection 81 will force the pin 80 inward against the board and furnish an abutment for the board so as to hold the board in place while the saw is cutting and then preventing pinching thereof.

In the modified form in Figs. 9 and 10, a simplified device is shown in which the gage bar 30 is omitted together with the parts thereon. This form is suitable for simple work where the length of the board should be only that given to the workman. A third similar stop, shown by dotted lines in Fig. 9, could be loosely mounted on the bar beyond stop 43 and stop 43 arranged to be elevated out of its way same as stop 43 in Figs. 3 to 6, inclusive, is elevated out of the way of main stop 40. I have here shown stop 42 to be offset so its face can be brought even with the face of stop 43, and I show it in this form because it is possible to register the stops shown in Figs. 1 and 3 likewise, but I do not wish to claim this as invention.

I do not wish to confine myself to the construction and arrangements herein shown because it is obvious to any one skilled in the art that I can leave off the calculators 61 and 70 and cut off the gage bar 30 at a point just beyond the housing 31 when the gage bar could be adjusted for accurate setting, by loosening the set screw 41 and knocking the gage bar 30 to right or left as required when tightening same, would make the gage bar ready for service. Neither do I wish to be confined to the gage bar 30 and the dial 35 being used in a horizontal position, nor directly over the guide bar 23 because some saws are so arranged, that it would be advantageous to have the dial 35 and gage bar to be vertical, and in such cases, some changes would be required for supporting the completed gage, which would not change the spirit of the invention. Therefore, any change in position without departing from the spirit of the invention, I wish the foregoing specifications and the following claims to be considered as covering.

The words "guide" or "guide bar" are intended for the same purpose, and also by the words "gage bar" in the foregoing specification and the following claims, I wish to be understood as meaning, the "guide" or "guide bar", the parts 22 and 23 or their equivalents against which a board is placed for pushing it to the saw or bringing the saw to it when in the act of cutting the same to any desired length. Gage bar is to be construed as meaning the bar 30.

I claim as my invention:

1. A saw gage including an oscillatory rod extending from the saw position, a plurality of stops thereon, the stop nearest the saw position being fixed on said rod and the other stop or stops being loosely mounted on said rod, and a projection on said rod for engaging and actuating each loosely mounted stop as the rod is turned and such projections being located relatively to the fixed stop and to each other so as to cause the loosely mounted stops to be actuated in succession after the movement of the fixed stop.

2. A gage including an oscillatory rod extending from the saw position, a plurality of stops loosely mounted on said rod, a set screw for clamping the stop nearest the saw position on said rod when adjusted, and a collar adapted to be clamped on said rod in an adjustable position adjacent the other stop and having a lug thereon adapted to engage and cause a revoluble movement of the stop adjacent thereto after a partial revolution of the rod from the normal position.

3. A saw gage including an oscillatory rod extending from the saw position, a plurality of stops thereon, means for adjustably securing the stop nearest the saw position on said rod and the other stop or stops being loosely mounted on said rod, a projection adapted to be slidable and rotatable on said rod for engaging and actuating each loosely mounted stop as the rod is turned, and means for securing each projection in adjusted position on said rod, said projections being adjusted in position relatively to each other so as to cause the loosely mounted stops to be actuated in succession after the movement of the fixed stop.

4. A saw gage including a main stop, means for determining the position of said main stop, and one or more preceding stops adapted to be set by said main stop.

5. A saw gage including a gage bar, a main stop slidable thereon, means coöperating with the gage bar for setting said main stop, a rod parallel with said gage bar, one or more stops carried by said rod, and means carried by said last-mentioned stops for engaging the main stop whereby the same may be set.

6. The combination of a sliding saw gage, a fraction-of-an-inch setting dial in connection therewith, a gage bar having a series of holes therein an inch apart from center to center, means for securing the setting dial in registration with said gage bar for setting the gage to standard measurement, additional means for changing the standard measurement position of the gage bar so as to provide the standard measurement and the additional measurement desired without calculation.

7. In means for making wooden boxes, the combination of a sliding saw gage, a fraction-of-an-inch setting dial in connection therewith, a gage bar having a series of holes therein an inch apart from center to center, means for securing the setting dial in registration with said gage bar for setting the gage to standard measurement, additional means for changing the standard measurement position of the gage bar so as to provide for the inside measurement plus the thickness of the ends of the boxes, and further additional means for changing the standard measurement position of the gage bar so as to provide for the thickness of the cleat of the box in addition to the inside measurement and the thickness of the ends without calculation.

8. A saw gage including a frame, a longitudinally slidable gage bar, a stop carried thereby, means for setting the stop, a plate pivotally connected with said gage bar and having radial arms and a series of holes in each arm at various distances from the pivot point of said plate, double fractions associated with each hole, each fraction indicating the distance between the center of the hole and the center of the pivot, and a pin insertible through any one of said holes for locking said plate with the frame.

9. A saw gage including a frame, a longitudinally slidable gage bar, a stop carried thereby, means for setting the stop, a plate connected with said gage bar and having a series of holes therethrough at various distances from the connection between the plate and gage bar, a pin insertible through any one of said holes for locking said plate in connection with the frame, and a second plate pivoted to the frame in proximity to and oscillated to a position over said first plate and provided with a series of holes located at various distances from the pivot point of said second plate and so that the holes in the two plates may register with each other and the said pin be insertible therethrough.

10. A saw gage including a frame, a longitudinally slidable bar, a stop carried thereby, means for setting the stop, a plate connected with said gage bar and having a series of holes therethrough at various distances from the connection between the plate and gage bar, a pin insertible through any one of said holes for locking said plate in connection with the frame, and a second plate pivoted to the frame in proximity to and oscillated to a position over said first plate and provided with a series of holes located at various distances from the pivot point of said second plate and said plate having radial arms similar to the first mentioned plate, whereby the holes in the two plates may register with each other and the said pin be insertible therethrough.

11. The combination with a movable table, a stationary table, and a saw mounted between said tables, of a saw gage having a frame mounted on the movable table so as to be adjustable longitudinally thereof and extending over and adapted to gage material held on the stationary table for the saw.

12. The combination with a movable table, a stationary table, and a saw mounted between said tables, of a saw gage having a frame and extending over and adapted to gage material held on the stationary table for the saw provided with longitudinal slots, and bolts extending through said slots to the movable table.

13. The combination with a movable table, a stationary table, and a saw mounted between said tables, of a saw gage having a frame, extending over and adapted to gage material held on the stationary table for the saw, a guide over said movable table, a longitudinal slot in said frame, and a bolt extending through said slot and into said guide.

14. A saw gage including a frame, a bar, means carried thereby against which the board to be cut is adapted to be placed, means for setting said guide bar for cutting standard measurements, and additional means for setting said guide bar for cutting material according to the standard measurement plus an extra measurement.

In witness whereof, I have hereunto affixed my signature in the presence of the witnesses herein named.

THOMAS BEMIS.

Witnesses:
J. H. WELLS,
O. M. McLAUGHLIN.

Copies of this patent may be obtained for five cents each, by addressing the "Commissioner of Patents, Washington, D. C."